United States Patent [19]
Perret, Jr. et al.

[11] Patent Number: 5,736,686
[45] Date of Patent: Apr. 7, 1998

[54] ILLUMINATION APPARATUS FOR A DIGITIZER TABLET WITH IMPROVED LIGHT PANEL

[75] Inventors: Joseph F. Perret, Jr., Silver Spring; Donald A. Ice, Ellicott City; William J. Kautter, Columbia, all of Md.

[73] Assignee: GTCO Corporation, Columbia, Md.

[21] Appl. No.: 396,617

[22] Filed: Mar. 1, 1995

[51] Int. Cl.$^6$ .............................. G08C 21/00; G09G 3/02
[52] U.S. Cl. .................. 178/18; 178/19; 178/87; 345/173; 345/175; 345/176
[58] Field of Search .................. 178/18, 19, 20, 178/87; 345/173, 175, 176; 362/31

[56] References Cited

U.S. PATENT DOCUMENTS

| | | | |
|---|---|---|---|
| 4,943,689 | 7/1990 | Siefer | 178/19 |
| 4,985,809 | 1/1991 | Matsui et al. | 362/31 |
| 5,001,306 | 3/1991 | Purcell | 178/19 |
| 5,028,744 | 7/1991 | Purcell | 178/18 |
| 5,134,549 | 7/1992 | Yokoyama | 362/31 |
| 5,153,386 | 10/1992 | Seifer et al. | 178/18 |
| 5,359,155 | 10/1994 | Helser | 178/18 |
| 5,565,657 | 10/1996 | Merz | 178/18 |

*Primary Examiner*—Curtis Kuntz
*Assistant Examiner*—Vijay Shankar
*Attorney, Agent, or Firm*—Cushman, Darby & Cushman IP Group of Pillsbury Madison & Sutro LLP

[57] ABSTRACT

An illumination apparatus for a digitizer tablet includes a support structure and a solid sheet optical light guide supported by the support structure and having first and second opposing surfaces and a plurality of edges. Light sources are carried by the support structure and positioned to direct light into light-receiving edges of the light guide. Reflecting structure is disposed adjacent the first surface of the light guide. A predetermined pattern is disposed on the first surface of the light guide structured and arranged in accordance with distance from the light sources.

23 Claims, 4 Drawing Sheets

ILLUMINATION APPARATUS FOR A DIGITIZER TABLET WITH IMPROVED LIGHT PANEL

FIELD OF THE INVENTION

This invention relates to the field of graphic digitizer tablets and systems for providing back-lighting of an object placed on the tablet for digitizing and more particularly to an improved method for providing uniform illumination across the entire digitizing tablet surface.

BACKGROUND OF THE INVENTION

Illumination systems are commonly used with graphic digitizing tablets to improve the operators ability to accurately trace drawings, prints, maps, photographs, etc. There are two main types of graphic digitizers that include an illumination system for back-lighting the object to be digitized. These are back-lit digitizers and surface-lit digitizers.

Back-lit digitizers have the illumination system mounted behind or underneath the digitizer tablet structure. The light required to illuminate the object to be digitize must first pass through the digitizer tablet structure. Such a system is shown in U.S. Pat. No. 4,943,689. These systems suffer from a number of undesirable characteristics, which are discussed below.

In a back lit digitizer the light required to illuminate the object to be digitized must first pass through the digitizer tablet structure. Typically non-back-lit digitizers are opaque, so a transparent or translucent digitizer tablet structure must be manufactured specifically for the back-lit digitizer models. Because it is difficult to make these structures totally optically transparent, some of the light is absorbed, requiring excess light and therefor heat to be produced. The excess heat must be dissipated, usually using cooling fans that can be noisy. Also, since the light is generated directly underneath the object being digitized, some the heat given off by the lighting system is radiated and conducted up through the digitizer tablet structure to the surface where it can be absorbed by the object being digitized. This can cause dimensional distortions and therefor errors in the digitizing process. In additional to the special transparent tablet structure and heat problems. Back-lit digitizers also suffer from excess weight. While a standard opaque 36" by 48" active area digitizer weighs approximately 50 lb, a back-lit version typically weighs approximately 150 lb.

Surface-lit digitizers normally have an illumination system mounted on top of a standard opaque digitizer tablet structure. The illumination system typically uses some type of optical waveguide to direct light to the center from either the edges of the tablet structure or from a light source located separate from the digitizer. The optical waveguide can be that of a mat of woven optical fibers or of a solid sheet of glass or plastic.

A surface-lit digitizer utilizing a optical fiber mat is described in U.S. Pat. No. 5,153,386. While this system does overcome the weight, heat, and tablet structure drawbacks of the back-lit digitizer, it has its own unique problems. The primary problem is that of the high cost of the optical fiber mat and the difficulty in making mats larger than 17" by 24". Additional problems come about from the complex structure of multiple laminated layers required to avoid optical defects.

The preferred system uses a solid sheet optical light guide, made of glass or plastic, with light sources mounted on the edges. The light guide sheet, or panel, has highly polished surfaces with one surface, either the top of bottom, having either a continuous disturbance pattern in the surface or a element disturbance pattern. Light injected into the edges of the solid sheet optical light guide, at less than the critical angle of incidence, will travel through the sheet until it encounters a disturbance in the surface of the light guide. Where light encounters a surface disturbance, the light is reflected at greater than the critical angle of incidence and the light is emitted to illuminate an object placed on top of the surface lighting system.

A surface light source panel of the nature describe above is presented in U.S. Pat. Nos. 4,985,809 and 5,134,549. While these surface lighting sources are not specifically designed for surface lit digitizer applications they could be modified accordingly. However, neither Patent solves the problem of producing a uniform surface lighting source especially when trying to illuminate an area of 36" by 48", a standard digitizer tablet active area.

Another surface light source, using a solid sheet optical light guide and specifically designed for a digitizer tablet, is shown in U.S. Pat. No. 5,359,155. This system uses particle blasting to produce the surface disturbance required to emit light from the solid sheet optical wave guide. However, this technique suffers from the inability to precisely control the amount of surface disturbance in any particular area and therefor the amount of light emitted. The system described in U.S. Pat. No. 5,359,155 is not commercially viable due to the non-uniformity of emitted light across the surface.

To produce a uniform amount of light emitted across the surface of the solid sheet optical wave guide requires the surface disturbance to be continuously varied from the point of light injection to the point farthest from the light sources. To do this with particle blasting would require precisely controlling, in real time, the particle size, air pressure, nozzle diameter, and distance from the nozzle to wave guide sheet as the blasting nozzle is scanned across the wave guide surface. Typical particle blasting systems cannot achieve the required amount of precision. Also, there is no practical way to measure and correlate the amount of surface disturbance to light intensity emission. Therefor, it is not possible to quantify the amount of change in the surface disturbance required, or what parameter to change to achieve a specified amount of change in intensity.

Accordingly, it can be appreciated that a need exists to provide an improved surface-lighting-system for a digitizer tablet which overcomes the inadequacies of the prior art devices by providing a substantially uniform light intensity across the entire surface of the solid sheet light wave guide.

SUMMARY OF THE INVENTION

An object of the invention is to fulfill the need referred to above. In accordance with the principles of the present invention, this objective is obtained by providing an illumination apparatus for a digitizer tablet. The apparatus includes a support structure and a solid sheet optical light guide supported by the support structure and having first and second opposing surfaces and a plurality of edges. At least one light source is carried by the support structure and positioned to direct light into a light-receiving edges of said solid sheet optical light guide. Reflecting structure is disposed adjacent the first surface of the light guide. A predetermined pattern associated with the first surface of the light guide, structured and arranged in accordance with distance from the light source.

The predetermined pattern associated with the first surface of the light guide may be created by employing any one of a variety of techniques. Example techniques include an additive process such as screen printing or photolithography on the first surface or a subtractive process such as chemical etching, or using laser deformation of or laser milling from the first surface. The pattern is arranged to create a surface disturbance so as to alter an angle of incidence of the light directed into the light guide thereby permitting light to be emitted from the second surface of the light guide with substantially uniform intensity.

In accordance with another aspect of the invention, a preferred method for generating a element pattern on a surface of a solid sheet optical light guide or panel is provided. The light guide has a predetermined illumination area. The method includes dividing the predetermined area into a plurality of square cells. Initial half tone density values of elements of the pattern are calculated for each cell. A linear interpolation of the density values from edge to edge of the cells is performed so as to generate half tone density values for each cell. Artwork is created based on the generated cell half tone density values and a pattern is formed on the light guide surface. Light output from each cell is then measured. If the light output is not in a desired range, a new half tone value for each cell is then calculated from the measurements so as to reduce the amount of light emission differential across the surface of the light guide. This process is repeated until the light intensity variation across the surface of the illuminated area is within desired prescribed limits.

Other objects, features and characteristics of the present invention, as well as the function of related elements of the structure, and the combination of parts and economies of manufacture, will become more apparent upon consideration of the following detailed description and the appended claims with reference to the accompanying drawings, all of which form a part of this specification.

DETAILED DESCRIPTION OF THE PRESENTLY PREFERRED EXEMPLARY EMBODIMENT

Figure 1:
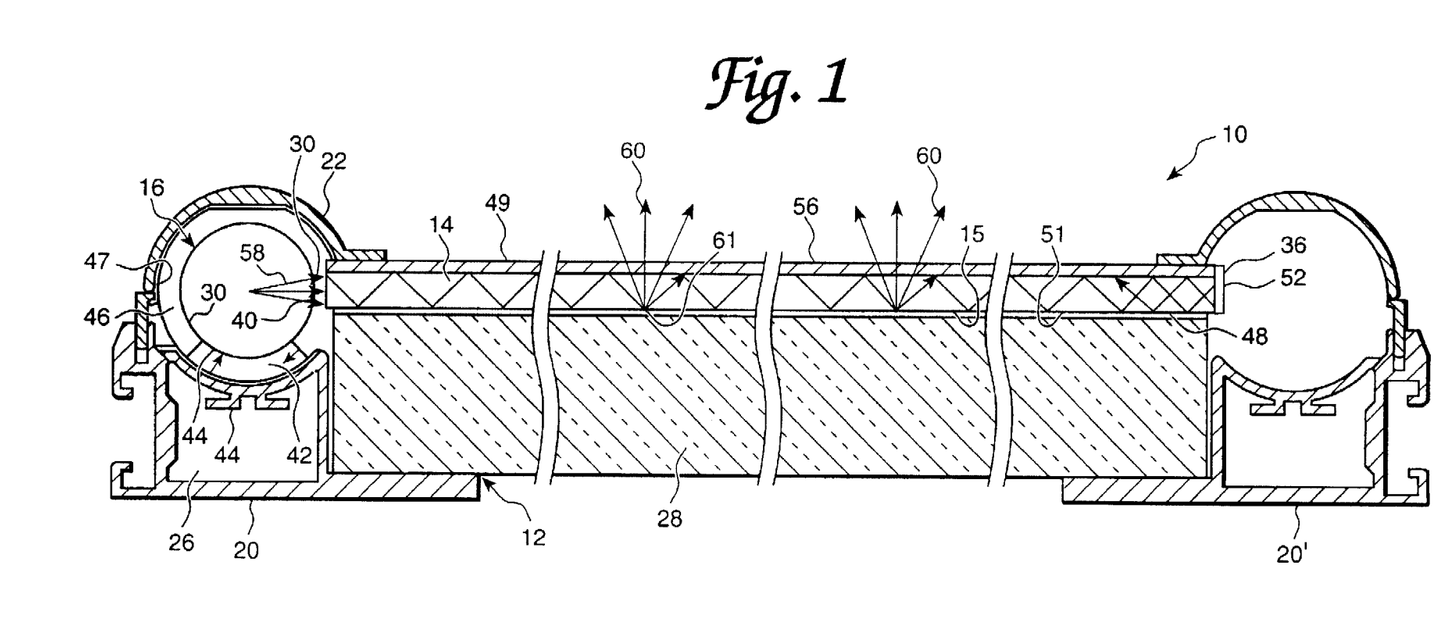
FIG. 1 is a schematic side view shown in section of an illumination apparatus provided in accordance with the principles of the present invention.

Referring now to the drawings, a side view of an illumination apparatus, generally indicated at 10, is shown in section in FIG. 1, which embodies the principles of the present invention. The apparatus 10 provides illumination for objects on a digitizer tablet and includes a support structure, generally indicated at 12, a solid sheet optical light guide 14, a light source, generally indicated at 16, carried by the support structure 12, and reflective structure 15 between a bottom surface of the solid sheet optical light guide 14 and a portion of the support structure 12.

The support structure 12 includes four generally identical frames disposed on each edge of the rectangular solid sheet optical light guide 14. A front frame 20' and a rear frame 20 are shown in FIG. 1. The left and right side frames are not shown in the drawings. Each frame comprises preferably extruded aluminum. When a light source 16 is mounted in an associated frame 20, a portion 22 of the frame 20 surrounds part of the light source 16. Further, portion 22 has a curvature corresponding to the curvature of the light source 16. Each frame defines a cavity 26 for use in wiring of the apparatus 10. The support structure 12 further includes an opaque digitizer core 28 of the type disclosed in U.S. Pat. No. 5,359,155, the disclosure of which is hereby incorporated by reference into the present specification.

Figure 2:
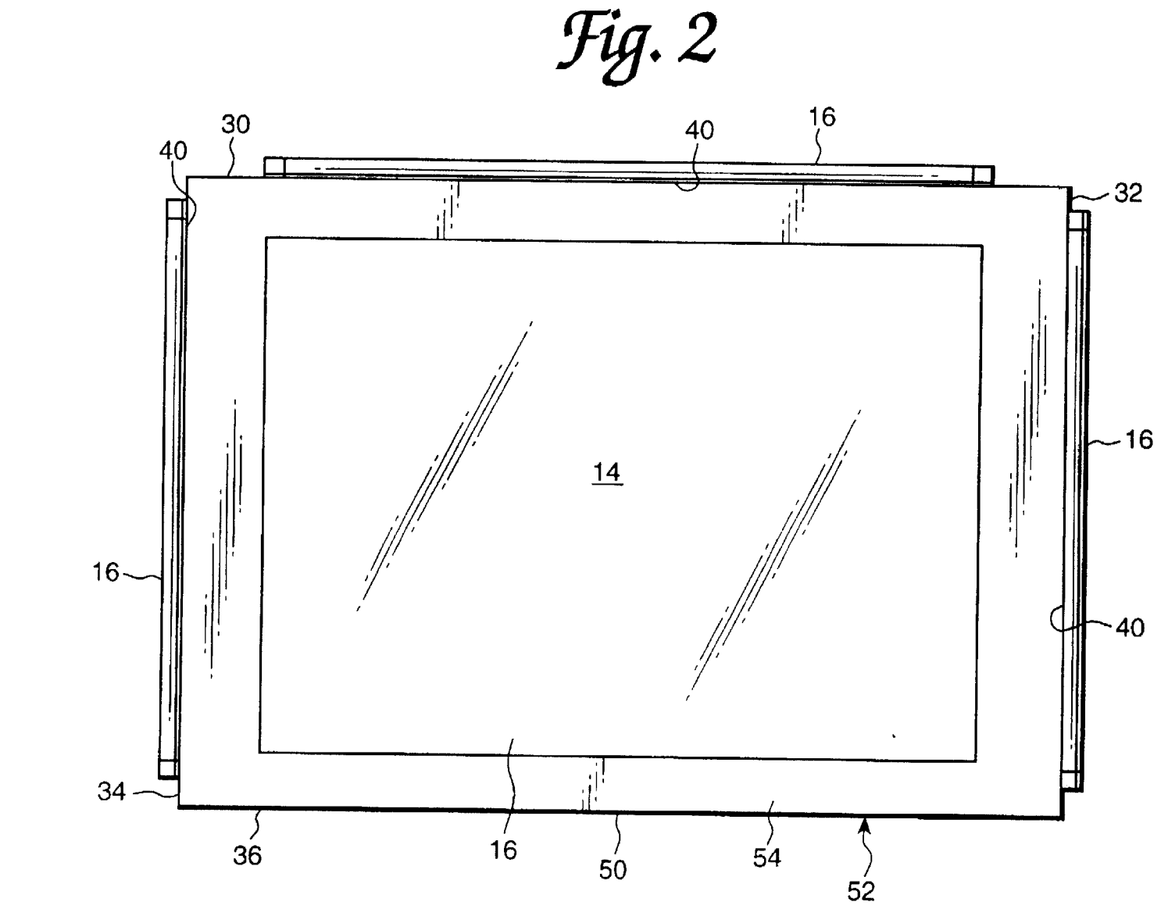
FIG. 2 is a plan view of a solid sheet optical light guide and opaque mask of the illumination apparatus of the invention, showing the location of the fluorescent bulbs; the support structure is not shown for clarity of illustration.

The solid sheet optical light guide 14, provided in accordance with the principles of the present invention, is positioned above the digitizer core 28. As schematically shown in FIG. 2, the light sources 16 comprise fluorescent light bulbs, such as aperture light bulbs. In the illustrated embodiment, three light bulbs 16 are provided: one light bulb 16 is disposed adjacent the light-receiving rear edge 30 and one light bulb 16 is provided on each of the two light-receiving side edges 32 and 34 of the light guide 14. The front edge 36 of the panel 14 does not include a light source and is thus a non-light receiving edge, the function of which will become apparent below.

Each of the three light sources 16 or fluorescent bulbs is mounted in an associated frame and includes a light reflective coating 38 on the inside surface thereof. Further, each bulb 16 has an aperture 40 extending the length thereof. As shown in FIG. 2, the aperture 40 is disposed adjacent an associated light-receiving edge of the solid sheet optical light guide 14.

As shown FIG. 1, the solid sheet optical light guide 14 is a relatively thick, generally rectangular sheet of optically clear material. Typically, the material is a clear plastic or acrylic that has a thickness of between approximately 0.25 to 0.50 inches. For thicknesses much less than 0.25 inches, it becomes difficult to inject a sufficient amount of light; and thicknesses much greater than 0.50 inches add unnecessary weight and cost to the apparatus 10. In the illustrated embodiment, the light guide is 0.375 inches thick. All edges 30, 32, 34 and 36 and the top surface 49 and bottom surface 51 of the light guide 14 are initially highly polished. Either the top surface 49 or the bottom surface 51 is partially disturbed to cause the light injected into the light guide 14 to be emitted therefrom in a predetermined pattern for even illumination.

There are many ways to disturb the surface of the light guide 14. The surface may be disturbed by adding material thereto (an additive process) or removing material therefrom (a subtractive process). An example of an additive process includes applying a element pattern to the surface. Subtractive techniques include etching a pattern or using a laser to remove material from or to deform the surface to generate the pattern.

In a preferred embodiment of the present invention, a half tone pattern 48 of elements is printed onto the bottom surface 51 the light guide. The elements are printed on 0.040 inch centers using standard screen printing and a white UV curable ink. The term "element" used herein is not limited to a circular shape, but may be of any geometric shape, for example, a square, a triangle, an ellipse, a star, etc. The element size for any particular location is a function of how much light is available at that location on the light guide 14. To achieve the required evenness of emitted light over, for example, a 36 inch by 48 inch illuminated area, the pattern 48 is based on 172,800 individual 0.10 inch square cells. A half tone density value is calculated for each cell. Within each cell, the element size can be varied in 256 increments. The element sizes are calculated based on having the three active light sources 16 and one reflective or virtual light source, as will be explained below.

Because the light of fluorescent bulbs spreads out somewhat horizontally, there is some leakage on the non-light injected edges of the light guide 16, or edges that are not associated with the aperture 40 of the associated bulb 16. The illustrated apparatus 10 uses three fluorescent aperture bulbs (FIG. 2) on the rear 30, right 32 and left 34 edges of the light guide 14. In addition, the front edge 36 of the light guide 14 is covered with a highly reflective coating or aluminized mylar tape 50 which creates the virtual bulb 52. Further, reflective tape 50 is disposed on all edge areas of the light guide that light is not being injected into. These areas are on either side of the bulb apertures since the bulb aperture lengths are 36 inches and 48 inches while, in the illustrated embodiment, the light guide 14 dimensions are approximately 54 inches by 42 inches.

To keep the profile of the apparatus 10 as thin as possible, the bulbs 16 are mounted somewhat below the surface of the digitizer, necessitating that they be located outside the area defined by the digitizer. The light guide 14 therefore has a length that light passes through without loss to reach the illuminated area. This is accomplished by not providing a pattern 48 in this area. Since the surface of the light guide in this area is not intentionally disturbed, light is transmitted therethrough without loss. However, in all the processing steps and handling that the light guides are subjected to, it is difficult to keep the surface of the light guides completely pristine; small scratches and scuffs therein are normal. While the amount of light loss due to the small surface disturbances are insignificant, the light emitted can be seen by the user. The unwanted light emitted from the non-illuminated area does not affect the use of the apparatus 10, but produces a negative aesthetic quality. To eliminate this unwanted light in the non-illuminated area, a black opaque mask 54 can be placed on top of the light guide 14 but underneath a diffuser 56. As shown in FIG. 1, the diffuser 56 is placed on top of the light guide.

The combination of the three bulbs 16 with the virtual bulb 52, created by the reflective tape, produces superior light guide brightness. A fourth bulb may be placed on front edge 36 of the light guide 14. It can be appreciated that the number of bulbs 16 used depends on the particular application and light guide size.

In preparing a light guide for use in an illumination apparatus, not only is a predetermined surface disturbance required, but the amount of disturbance of any given area must be controlled accurately. If one area has a greater or lesser surface disturbance than it is supposed to have relative to an adjacent area, the original area will appear brighter or darker respectively than its adjacent area. Thus, in accordance with the invention, the element sizes of the pattern 48 are structured and arranged based in part on the distance of the pattern element from the light sources. The amount of light available at any one spot is a function of the amount of light injected, the amount of light that has been lost to previous light emission, and the distance of the element location from the various light sources. The further away from the bulb, the less light available, the larger the element has to be or the greater the density of identically-sized elements, to achieve even brightness over the entire surface area of the light guide 14.

While the relationship between element size and density and the amount of light available is complex and difficult to model mathematically, there are many ways to define the pattern 48. For example, the pattern may have a fixed pitch with variable size elements, wherein the size of the element varies and the density of the elements remains constant, within, for example, a cell of the light guide surface. Alternatively, the pattern can have a variable pitch with a fixed element size, wherein the size of the elements are fixed and the density of the elements varies within, for example, a cell of the light guide surface. As an illustrative example, the following discusses the fixed pitch/variable element size technique.

In determining the proper pattern 48, the initial element sizes are calculated using a first order approximation of the inverse distances from each light source 16 plus the distance from the light source to the reflective surface and back 52, as is evident from the equation set forth below. The 36" by 48" area is broken down into a 9 by 12 array of 4" square cells. A 4" square cell limits the number of measurements to be taken for the iterative process of half tone density changes to achieve even illumination across the surface of the light guide. Half tone densities are calculated for the outside edges and intersection of the 4" square cells. Linear interpolation is used to calculate the half tone density for the individual 0.1" square cells within the 4" square cells. The initial maximum half tone density is preferably set at 30%. This means that a cell with a 30% half tone has 30% of the area in that cell disturbed (e.g. has a pattern formed thereon). The following equation is used to calculate the initial half tone density values.

$$D_{cht} = \frac{K_{mht}}{\frac{1}{d_{L1}} + \frac{1}{d_{L2}} + \frac{1}{d_{L3}} + \frac{1}{d_{L3_{LV}} + d_{LV}}}$$

where:

$D_{cht}$ the cell half tone density.

$K_{mht}$ is the max half tone density, constant.

$d_{L1}$ is the distance to light source 1.

$d_{L2}$ is the distance to light source 2.

$d_{L3}$ is the distance to light source 3.

$d_{L3\_LV}$ is the distance from light source 3 to the reflective edge virtual bulb.

$d_{LV}$ is the distance to the reflective edge virtual bulb.

Using the half tone density equation and a conventional spread sheet program, half tone densities are calculated for each of the 4" square cells. The values are shown below in Table 1.

TABLE I

| | | | PATTERN 1 HALF TONE DENSITIES CALCULATIONS | | | | | | | | | | | |
|---|---|---|---|---|---|---|---|---|---|---|---|---|---|---|
| | | Dist_C | 54 | 50 | 46 | 42 | 38 | 34 | 30 | 26 | 22 | 18 | 14 | 10 | 6 |
| | | Dist_D | 6 | 10 | 14 | 18 | 22 | 26 | 30 | 34 | 38 | 42 | 46 | 50 | 54 |
| Dist_A | Dist_B | | 0 | 4 | 8 | 12 | 16 | 20 | 24 | 28 | 32 | 36 | 40 | 44 | 48 |
| 39.5 | 3.5 | 36 | 7.0% | 8.1% | 8.7% | 9.0% | 9.2% | 9.3% | 9.3% | 9.3% | 9.2% | 9.0% | 8.7% | 8.1% | 7.0% |
| 35.5 | 7.5 | 32 | 10.3% | 12.8% | 14.2% | 15.1% | 15.6% | 15.9% | 16.0% | 15.9% | 15.6% | 15.1% | 14.2% | 12.8% | 10.3% |
| 31.5 | 11.5 | 28 | 11.9% | 15.4% | 17.6% | 18.9% | 19.8% | 20.2% | 20.4% | 20.2% | 19.8% | 18.9% | 17.6% | 15.4% | 11.9% |
| 27.5 | 15.5 | 24 | 12.9% | 17.1% | 19.8% | 21.5% | 22.6% | 23.2% | 23.4% | 23.2% | 22.6% | 21.5% | 19.8% | 17.1% | 12.9% |
| 23.5 | 19.5 | 20 | 13.5% | 18.3% | 21.3% | 23.4% | 24.7% | 25.4% | 25.6% | 25.4% | 24.7% | 23.4% | 21.3% | 18.3% | 13.5% |
| 19.5 | 23.5 | 16 | 14.0% | 19.1% | 22.4% | 24.7% | 26.1% | 26.9% | 27.2% | 26.9% | 26.1% | 24.7% | 22.4% | 19.1% | 14.0% |
| 15.5 | 27.5 | 12 | 14.3% | 19.6% | 23.2% | 25.6% | 27.2% | 28.1% | 28.3% | 28.1% | 27.2% | 25.6% | 23.2% | 19.6% | 14.3% |
| 11.5 | 31.5 | 8 | 14.5% | 20.0% | 23.8% | 26.3% | 27.9% | 28.9% | 29.2% | 28.9% | 27.9% | 26.3% | 23.8% | 20.0% | 14.5% |
| 7.5 | 35.5 | 4 | 14.6% | 20.3% | 24.1% | 26.7% | 28.4% | 29.4% | 29.7% | 29.4% | 28.4% | 26.7% | 24.1% | 20.3% | 14.6% |
| 3.5 | 39.5 | 0 | 14.7% | 20.4% | 24.3% | 27.0% | 28.7% | 29.7% | 30.0% | 29.7% | 28.7% | 27.0% | 24.3% | 20.4% | 14.7% |

30% normalization constant = 0.034    max half tone density = 30%
min half tone density = 7%

Dist_A is the distance to the virtual bulb at the front edge
Dist_B is the distance to the bulb at the back edge
Dist_C is the distance to bulb at the right edge
Dist_D is the distance to the bulb at the left edge.

Half tone densities range from the maximum fixed amount of 30%, down to 7%. To acquire the half tone percentage for the individual 0.1" cells, a linear interpolation is done from each edge of the 4" cells. The first step is to generate a data file using, for example, a commercially available spread sheet program, of the 4" cell half tone density values. Next, a linear interpolation of the density values is performed from edge to edge. The result is a bit map file of the 0.1" square cell half tone density values. One way of achieving the linear interpolation is through the use of a computer program. One such program in the "C" language is presented below.

---

LIGHT LEAK PATTERN GENERATION PROGRAM
This program generates a data file that gives the percent area of coverage for the half tone pattern. The input is a data file of percent area coverage an 4" centers. This program interpolates between the 4" centers to a resolution defined by the variable "inc". Half tone percents are calculated for small squares or pixels is based on the value of "inc". The half tone percent is calculated for each corner of the pixel, then averaged for the pixel value. The half tone value is converted to a 0 to 255 level grey scale and output to a bit map file.

```c
#include <stdio.h>
#include <stdlib.h>
#define   CR      0XD     /* CARRIAGE RETURN */
#define   ENTER   0xd
#define   LF      0x0a    /*Line Feed */
#define   ESC     0x1b
#define   BS      0x08    /* back space character */
FILE *output_file, *input_file, *header_file;
int i, j, k, l, hex_value, file_flg;
long pixel_counter;
float a, b, c, d, x, y, inc, temp, input_data[10][13];
float corner1, corner2, corner3, corner4, half_tone;
char binary_value, byte, temp_string[20], file_name[12];
void main()
{
pixel_counter = 0;
inc = .025;       /* 40 by 40 cells per 4" square, 480 by 360 for panel */
/**************** READ INPUT / OUTPUT FILE ***********************/
file_flg = 0;
while (file_flg == 0)
    {
    clrscr();
    printf("[r]Enter I/O file name, 8 characters max, no extention: ");
    for (i= 0; (i<10 && file_flg == 0); i++)
        {
        file_name[i] = getch(); /* read file name one char at a time */
        if (file_name[i] == ESC)  /*if ESC entered terminate file name read */
            exit(1);
        else if (file_name[i] == BS)
            {
            if (i > 0)
                {
```

```
                    i=i-2;
                    printf("■ ■");
                }
            else if (file_name[i] == CR)
                {
                if (i == 0) /* if only carrage return, terminate file name read */
                    exit(1);
                else        /* else accept name */
                    {
                    file_name[i] = 0;   /* null terminate file name */
                    i=10;
                    }
                }
            else
                printf("%c", file_name[i]);
            }
        if (file_flg == 0)
            {
            clrscr()
            if (strlen(file_name) > 8)
                {
                printf("Too many characters, press any key to continue[r]");
                while (!kbhit());
                getch();
                clrscr();
                }
            else
                {
                strcpy (temp_string, file_name);
                strcat(temp_string, ".dat");
                if ((input_file = fopen(temp_string, "r")) == NULL)
                    }
                clrscr();
                    printf("rFile %s - does not exist -   ", temp_string);
                    printf("Press any key to continue");
                    while(!kbhit());
                    getch();
                    }
                else
                    file_flg = 1;
                }
        }   /* end "if (file flag == 0)" */
    {   */* end "while (file flag == 0)" */
strcpy (temp_string, file_name);
strcat(temp_string, ".bmp");
output_file = fopen(temp_string, "w");  /* open ouput data file */
header_file = fopen("header.bmp", "r"); /* open header file */
/******************* READ INPUT DATA FILE INTO AN ARRAY *****************/
for(j=0; j<=9; j++) /* The data is in a 10 by 13 floating point ASCII array file */
    {
    for(i=0; i<=12; i++)
        }
        fscanf(input_file, "%f", &temp);
        input_data[j][i] = temp;
        }
    }
/*********** READ BIT MAP FILE HEADER AND PUT IN OUTPUT FILE ***/
for(i=0; j<54;. i++) /* first 54 bytes */
    {
    fscanf(header_file, "%c", &byte);
    fprintf(output_file, "%c", byte);
    }
/******************* CALCULATE PIXEL HALF TONE PERCENTAGE ***************
Calculate pixel half tone percentage starting at the upper left and scanning
to the upper right. Then move one pixel down and repeat. Corner1-4 are the
pixel corner values */
for(j=0; j<=8; j++) /* move down the 4" square input array from upper left*/
    {
    for(k=0; k<40; k++) /* move down the side of each 4" square 40 increments*/
        {
        y =k*inc;
        for(i=0; i<=11; j++)   /* move left to right of the 4" square array */
            {
            for(l=0; l<40; l++) /* move left to right of each 4" square */
                {
                x = l*inc;
                    a = input_data[j][i];       /* upper left 4" square corner value */
                    b = input_data[j][i+1];     /* upper right 4" square corner value */
                    c = input_data[j+1][i+1];   /* lower right 4" square corner value */
                    d = input_data[j+1][i];     /* lower left 4" square corner value */
```

-continued

```
corner1 = (a-x*(a-b)) - y* ((a-x*(a-b))-(d-x*(d-c)));
corner2 = (a-(x+inc)*(a-b)) - y*((a-(x+inc)*(a-b))-(d-(x+inc)*(d-c)));
corner3 = (a-(x+inc)*(a-b)) - (y+inc)*((a-(x+inc)*(a-b))-(d-(x+inc)*(d-c)));
corner4 = (a-x*(a-b)) - (y+inc)*((a-x*(a-b)) - (d-x*(d-c)));
half_tone = (corner1+corner2+corner3+corner4)/4;
binary_value = (1-half_tone) * 255;
fprintf(output_file, "%c", binary_value);  /* three bytes per pixel */
fprintf(output_file, "%c", binary_value);  /* red, blue, and green */
fprintf(output_file, "%c", binary_value);  /* but grey all same */
printf("Pixel count = *lu[r]", pixel_counter);
pixel_counter++;
         }
      }
   }
}
fclose(input_file);
fclose(output_file);
fclose(header_file);
}
```

Figure 3:
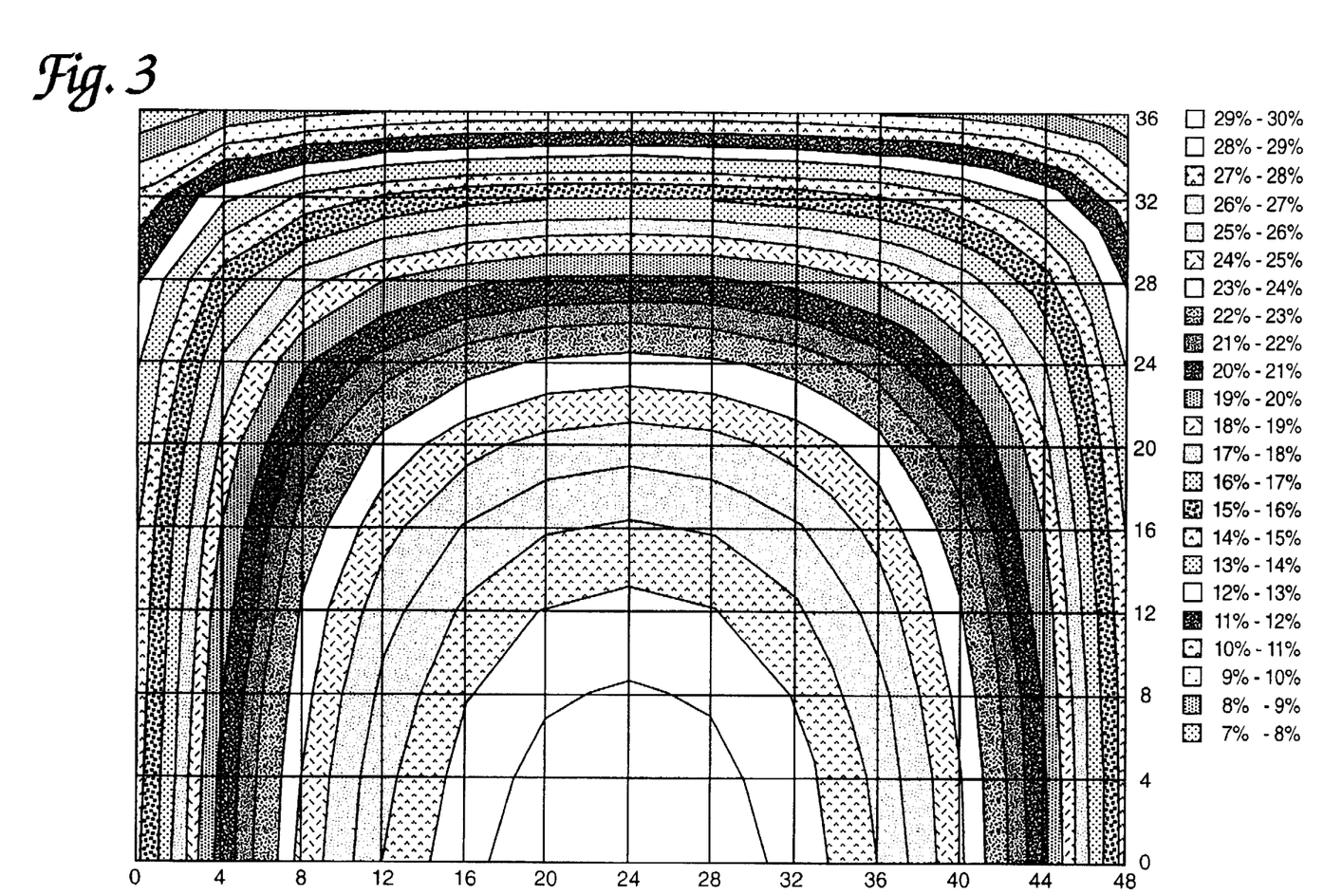
FIG. 3 shows a half tone density distribution of a panel of the invention, wherein the shading represents percent half tone density.

FIG. 3 shows the half tone density distribution of a linear interpolation with a 1% resolution for the 0.1" cells. In one light guide produced, the actual linear interpolation for the 0.1" cells has a resolution of approximately 0.4%.

Figure 4:
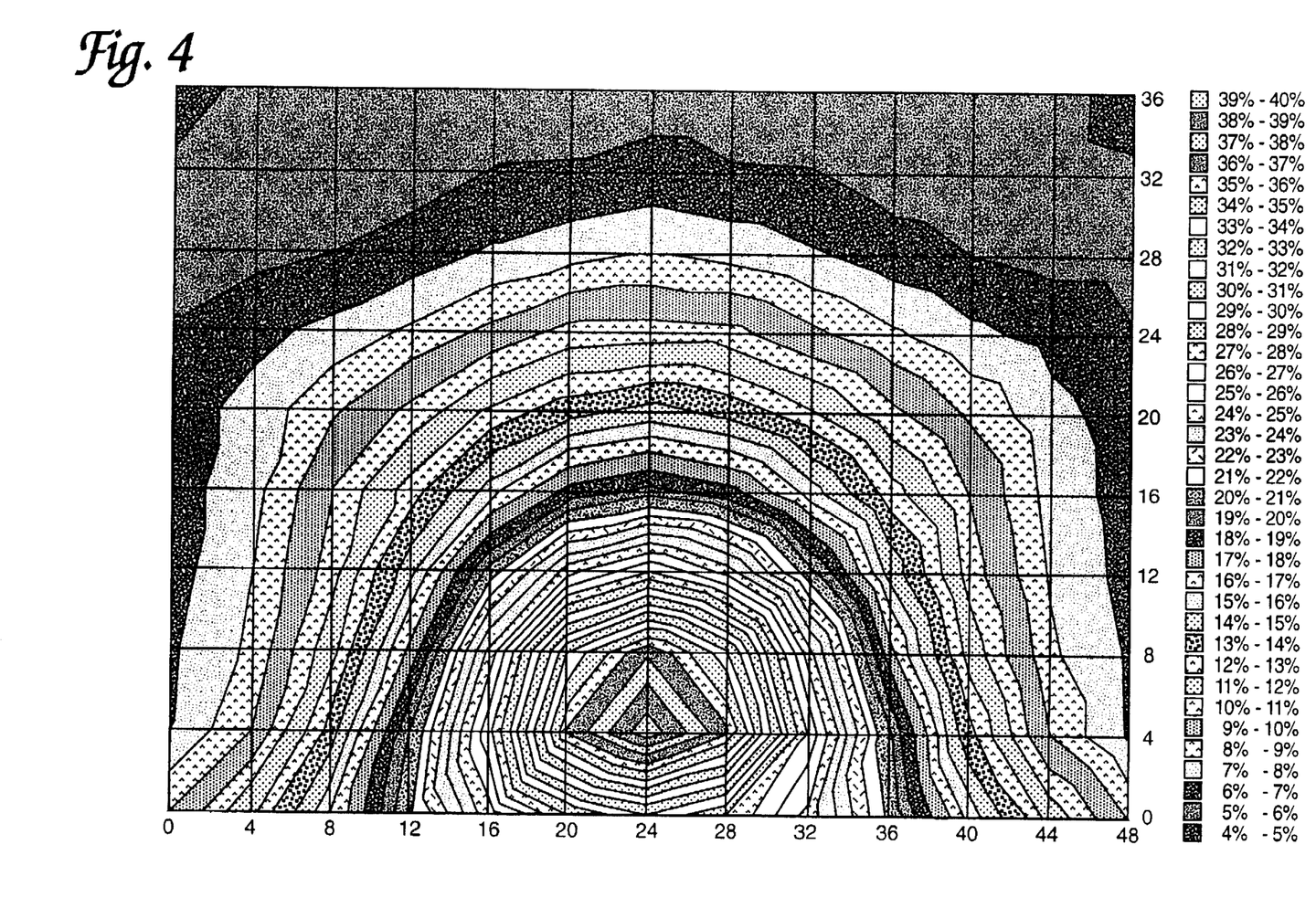
FIG. 4 shows another half tone density distribution of a panel of the invention, wherein the shading represents percent half tone density.

Art work can be produced that has the predetermined pattern with determined half tone densities. The pattern can then be applied to the light guides by, for example screen printing, or any of the additive or subtractive techniques. Measurements may be taken of the light emissivity for each 4" square cells. These measurements and the original half tone density values for the 4" square cells are then used to calculate a new set of half tone density values. This reduces the amount of light emission differential across the surface of the light guide. The following formula is used for calculating the new half tone density values. Since the light guide is desirably symmetrical, photometer readings from opposing left and right cells are averaged together to obtain a symmetrical new half tone density pattern.

$$D_{cht} = \frac{I_{avg} * D_{cht_p} * K_m}{(I_{lc} + I_{rc}) * 0.5}$$

where:

$D_{cht}$ is the cell half tone density $I_{avg}$ is the average non-border photometer reading $I_{Lc}$ is the left cell photometer reading $I_{rc}$ is the right cell photometer reading $D_{cht_p}$ is the previous cell half tone density $k_{mht}$ is the max density normalization constant This process of calculating new half tone density values, printing new light guides, then taking light output measurements is repeated until a satisfactory evenness in the light output across the surface of the light guide is achieved. Table II below shows the calculation for a completed pattern iteration and FIG. 4 shows the half tone density distribution thereof.

PATTERN 7 HALF TONE DENSITY CALCULATIONS

This set of data is the average from three Color Process PATTERN 6 panels in one enclosure, ATS0894-02

|  | L/E | 4 | 8 | 12 | 16 | 20 | 24 | 28 | 32 | 36 | 40 | 44 | R/E |
|---|---|---|---|---|---|---|---|---|---|---|---|---|---|
| T/edge | 22.3 | 22.3 | 22.3 | 22.6 | 20.6 | 20.3 | 20.2 | 19.8 | 20.6 | 20.3 | 18.8 | 17.4 | 17.8 |
| 32 | 23.0 | 23.1 | 23.2 | 23.7 | 21.5 | 21.7 | 20.4 | 20.7 | 21.6 | 22.5 | 20.3 | 18.5 | 18.1 |
| 28 | 22.5 | 23.6 | 22.1 | 23.6 | 21.7 | 20.6 | 19.7 | 20.3 | 21.5 | 21.6 | 21.7 | 19.3 | 18.0 |
| 24 | 21.6 | 21.2 | 21.2 | 22.5 | 20.9 | 19.8 | 19.7 | 19.7 | 21.0 | 21.3 | 21.5 | 18.3 | 17.8 |
| 20 | 19.2 | 18.2 | 19.5 | 19.9 | 18.6 | 18.3 | 17.1 | 17.3 | 18.4 | 19.9 | 18.7 | 16.6 | 16.3 |
| 16 | 17.3 | 18.3 | 18.2 | 18.8 | 17.2 | 17.1 | 16.5 | 16.3 | 18.1 | 19.2 | 19.2 | 16.5 | 16.2 |
| 12 | 16.6 | 17.3 | 17.1 | 17.0 | 16.4 | 16.0 | 15.6 | 16.3 | 17.7 | 18.4 | 18.7 | 16.2 | 16.3 |
| 8 | 15.4 | 16.4 | 16.9 | 16.7 | 16.1 | 15.4 | 14.4 | 16.0 | 17.8 | 18.8 | 19.0 | 16.1 | 15.1 |
| 4 | 14.3 | 15.5 | 16.3 | 16.1 | 15.1 | 14.3 | 13.5 | 14.5 | 17.0 | 17.6 | 18.7 | 17.3 | 14.6 |
| B edge | 13.4 | 14.5 | 15.4 | 14.7 | 14.2 | 14.3 | 14.2 | 15.0 | 15.8 | 16.8 | 17.6 | 15.8 | 14.8 |
|  | min |  |  | 13.4 |  |  | average |  |  |  | 18.4 |  |  |
|  | max |  |  | 23.7 |  |  | non-uniform |  |  |  | 28% |  |  |

Calculated cell coverage values for Pattern 6 from pattrn5.xts (Pattern 6 used Pattern 5 data)

|  | L edge | 4 | 8 | 12 | 16 | 20 | 24 | 28 | 32 | 36 | 40 | 44 | R/E |
|---|---|---|---|---|---|---|---|---|---|---|---|---|---|
| T edge | 6.5% | 4.8% | 4.9% | 5.1% | 5.1% | 5.1% | 5.2% | 6.1% | 5.1% | 5.1% | 4.9% | 4.8% | 6.5% |
| 32 | 5.4% | 5.1% | 5.2% | 5.7% | 6.0% | 6.0% | 6.0% | 6.0% | 6.0% | 5.7% | 5.2% | 5.1% | 5.4% |
| 28 | 5.3% | 5.6% | 6.1% | 6.9% | 7.4% | 7.5% | 7.6% | 7.5% | 7.4% | 6.9% | 6.1% | 5.6% | 5.3% |
| 24 | 5.5% | 6.3% | 7.4% | 8.7% | 9.5% | 10.3% | 10.4% | 10.3% | 9.5% | 8.7% | 7.4% | 6.3% | 5.5% |
| 20 | 5.5% | 6.3% | 8.3% | 10.3% | 11.5% | 12.5% | 12.8% | 12.5% | 11.5% | 10.3% | 8.3% | 6.3% | 5.5% |
| 16 | 5.2% | 6.4% | 9.4% | 12.1% | 14.3% | 16.2% | 16.9% | 16.2% | 14.3% | 12.1% | 9.4% | 6.4% | 5.2% |

| PATTERN 7 HALF TONE DENSITY CALCULATIONS | | | | | | | | | | | | |
|---|---|---|---|---|---|---|---|---|---|---|---|---|
| 12 | 5.1% | 6.4% | 9.5% | 13.6% | 18.4% | 22.0% | 23.4% | 22.0% | 18.4% | 13.6% | 9.5% | 6.4% | 5.1% |
| 8 | 5.0% | 6.5% | 10.6% | 16.1% | 23.0% | 28.9% | 29.7% | 28.9% | 23.0% | 16.1% | 10.6% | 6.5% | 5.0% |
| 4 | 4.8% | 7.2% | 12.0% | 17.9% | 24.0% | 29.0% | 30.0% | 29.0% | 24.0% | 17.9% | 12.0% | 7.2% | 4.8% |
| B edge | 6.2% | 9.1% | 13.6% | 17.4% | 20.6% | 22.8% | 23.8% | 22.8% | 20.6% | 17.4% | 13.6% | 9.1% | 6.2% |

Corrected half tone cell values for Pattern 7 based on above two data set average. Columns L/E to 20 are based on average of left and right values. Columns 28 to R/E are a mirror image of L/E to 20

| | 0 | 4 | 8 | 12 | 16 | 20 | 24 | 28 | 32 | 36 | 40 | 44 | 48 |
|---|---|---|---|---|---|---|---|---|---|---|---|---|---|
| 36 | 5.8% | 4.4% | 4.3% | 4.3% | 4.4% | 4.6% | 4.7% | 4.6% | 4.4% | 4.3% | 4.3% | 4.4% | 4.8% |
| 32 | 4.7% | 4.4% | 4.3% | 4.5% | 5.0% | 5.1% | 5.3% | 5.1% | 5.0% | 4.5% | 4.3% | 4.4% | 4.7% |
| 28 | 4.7% | 4.7% | 5.0% | 5.4% | 6.1% | 6.6% | 7.0% | 6.6% | 6.1% | 5.4% | 5.0% | 4.7% | 4.7% |
| 24 | 5.1% | 5.7% | 6.3% | 7.2% | 8.2% | 9.4% | 9.4% | 9.4% | 8.2% | 7.2% | 6.3% | 5.7% | 5.1% |
| 20 | 5.6% | 6.3% | 7.8% | 9.3% | 11.2% | 12.6% | 13.4% | 12.6% | 11.2% | 9.3% | 7.8% | 6.3% | 5.6% |
| 16 | 5.6% | 6.6% | 9.0% | 11.4% | 14.6% | 17.4% | 18.4% | 17.4% | 14.6% | 11.4% | 9.0% | 6.6% | 5.6% |
| 12 | 5.6% | 6.9% | 9.5% | 13.8% | 19.4% | 24.5% | 26.9% | 24.5% | 19.4% | 13.8% | 9.5% | 6.9% | 5.6% |
| 8 | 5.9% | 7.2% | 10.6% | 16.3% | 24.4% | 33.1% | 37.0% | 33.1% | 24.4% | 16.3% | 10.6% | 7.2% | 5.9% |
| 4 | 6.0% | 7.9% | 12.3% | 19.0% | 26.8% | 36.2% | 40.0% | 36.2% | 26.8% | 19.0% | 12.3% | 7.9% | 6.0% |
| 0 | 7.9% | 10.7% | 14.8% | 19.8% | 24.7% | 28.0% | 30.1% | 28.0% | 24.7% | 19.8% | 14.8% | 10.7% | 7.9% |

40% normalization constant: 0.977    max = 40.0%    min = 4.3%

Another way of obtaining the predetermined pattern 48 is to start with a homogeneous half-tone pattern, for example 10%, across the entire illuminated surface of the light guide 14. The pattern is then applied to the light guide and light intensity measurements are taken. The above program can then be used to generate new artwork. This process is repeated until a suitable evenness of light is achieved.

Since the fluorescent bulbs 16 have very high intensity output, most of the light produced is in the UV spectrum which is converted to the visible spectrum by the fluorescent coating 38 on the inside of the bulb 16. However, there is also a significant amount of infrared light emitted by the bulb 16 in the form of heat. If the infrared light is absorbed by the surrounding structure and not dissipated, there will be excessive localized heating which can reduce both the intensity of the visible light emitted as well as the life of the bulb 16. The temperature of the bulb 16 is controlled by mercury vapor pressure inside the bulb. The optimum pressure and therefore bulb temperature can be achieved by cooling a small surface area of the bulb 16 near its end. A preferred temperature is approximately 105° F. Keeping this small area at approximately 105° F. increases the life of the bulb and optimizes its performance. In that regard, a heat conductive spacer 42, preferably of aluminum, is disposed between a surface of each frame and the outer surface of an associated bulb 16. The spacer 42 provides conductive cooling of an associated bulb 16. To maximize the thermal conductivity of the spacer 42, its surfaces can be shaped so as match the curvature of the bulb and frame as closely as possible. To further enhance heat transfer, a thin thermally conductive coating or tape 44 can be placed between the spacer 42 and the bulb 16 and between the spacer 42 and an associated frame. The heat transfer spacer 42 contacts the small surface area on the bulb 16 to lower its temperature.

Convective cooling is provided by air flow around the bulb 16 channeled by a cavity 46 formed around the bulb 16 and defined by the frame. The air flow is produced by an exhaust fan (not shown) in a ballast box connected to the frame.

Radiative cooling is provided by the large surface area of the frame exposed to ambient air. Removal of excess heat from around the bulb 16 not only increases the life of the bulb 16, but also increases user comfort since the surfaces of the frame are cooled using any or all of the above techniques.

It should be noted that even if the fluorescent bulbs 16 have a reflective coating 38 on the inside of the glass envelope thereof, some light does escape therethrough. To capture this light, the inside surfaces of the frame that houses a bulb 16 can be coated with reflective coating, such as silver tape 47. The tape 47 reflects the light that escapes through the reflective coating 38 and sends the light back through the bulb and into the light guide 14.

The operation of the apparatus 10 will be appreciated from the following discussion. Light 58 is injected into the light guide 14 using the three florescent bulbs 16 that have been modified by the addition of the reflective coating 38 on the inside thereof and which have the relatively thin aperture 40 cut into the reflective and florescent coatings thereof. Each aperture 40 allows the majority of light produced by the bulb 16 to be emitted in a long thin strip. Each florescent bulb is mounted in close proximity to edges 30, 32 and 34 of the light guide 16. With the aperture 40 aligned with an associated light-receiving edge of the light guide such that the maximum amount of light emitted by the florescent bulb is injected into the light guide, light that enters the light guide 14 at less than the critical angle of incidence, which is most of the light, is reflected by the highly polished top and bottom surface 49 and 51, respectively, towards the opposing surface. The light strikes the opposing surface where it is again reflected. The light continues to be reflected and travels to the inside of the light guide where it eventually meets the partially disturbed surface defined by the pattern 48. Some of the light that strikes elements or surface disturbances 61 of the partially disturbed surface has its angle of incidence modified to be greater than the critical angle of incidence. This light 60 is emitted either out of the top or bottom of the light guide. The light that is emitted out of the top of the panel is directly viewable by the user. Light that is emitted out of the bottom of the light guide is reflected off the reflecting structure, e.g. a white surface 15, which is disposed adjacent to the light guide 14. This light travels back through the light guide and is then viewable by the user. The rest of the light, whose angle of incidence has not been modified beyond the critical angle, is reflected to the undisturbed surface where it is reflected back to the partially disturbed surface.

Thus, it can be appreciated that the present invention provides an illumination apparatus with a light guide 14 and a method of generating a predetermined, well-defined pattern 48 thereon. Light guides constructed in accordance wit the present invention provide a substantially uniform light intensity across the surface of the light guide.

It is thus been seen that the objects of this invention have been fully and effectively accomplished. It will be realized, however, that the foregoing preferred embodiment has been shown and described for the purposes of illustrating the structural and functional principles of the present invention and can be changed without departing from such principles. Therefore, this invention includes all modifications encompassed within the spirit of the following claims.

What is claimed is:

1. An illumination apparatus for a digitizer tablet, the apparatus comprising:
   a support structure;
   a solid sheet optical light guide positioned above said support structure and having first and second opposing surfaces and a plurality of edges;
   at least one light source carried by said support structure and positioned to direct light into at least one light-receiving edge of said light guide; and
   reflecting structure disposed adjacent said first surface of said light guide.
   a predetermined non-uniform pattern of surface disturbances associated with said first surface of said light guide, said pattern being structured and arranged in accordance with distance from said at least one light source.

2. The apparatus according to claim 1 wherein said at least one light source comprises a at least one fluorescent light bulb positioned adjacent said at least one light-receiving edge.

3. The apparatus according to claim 2, wherein exposed edges of said light guide, which are not adjacent said light bulb, are covered with a reflective coating such that light will not leak from said exposed edges.

4. The apparatus according to claim 1, wherein said edges including at least one light-receiving edge and at least one non-light-receiving edge, said non-light-receiving edge including a light reflecting coating thereon so as to define a virtual light source, and wherein said pattern is structured and arranged in accordance with distance from said at least one light source and said virtual light source.

5. The apparatus according to claim 1, wherein said at least one light source comprises a fluorescent light bulb with a reflective coating on the inside surface thereof and an aperture therein, said aperture being disposed adjacent a respective light-receiving edge so that light from said light bulb may be directed through the aperture and into said light guide.

6. The apparatus according to claim 1, wherein exposed edges of said light guide, which are not adjacent a respective one of said at least one light source, are covered with a reflective coating such that light will not leak from said exposed edges.

7. The apparatus according to claim 1, wherein said support structure comprises: four frames, one frame being associated with one edge of said light guide, three of said frames having a portion which substantially surrounds an associated one of said at least one light source, each said portion having a curvature which corresponds to a curvature of an associated light bulb, an inner surface of each said portion including a reflective coating so as to reflect light which escapes from the associated light source back through the light source so as to be directed into the light guide; and a digitizer core supported by the frames, said light guide being disposed on a surface of said digitizer core.

8. The apparatus according to claim 7, wherein a heat conductive spacer is provided between a surface of a light source and a surface of an associated frame so as to remove heat from the associated light source.

9. The apparatus according to claim 1, wherein said light guide comprises a light guide of optically clear material.

10. The apparatus according to claim 9, wherein said light guide comprises a clear plastic light guide.

11. The apparatus according to claim 9, wherein said light guide comprises an acrylic light guide.

12. The apparatus according to claim 1, wherein said predetermined pattern comprises individual elements having respective locations and sizes determined in accordance with distances from said at least one light source.

13. The apparatus according to claim 12, wherein said individual element sizes vary inversely with the distance from said at least one light source.

14. The apparatus according to claim 4, wherein said predetermined pattern comprises individual elements having respective locations and sizes determined in accordance with distances from said at least one light source and a distance from said virtual light source.

15. A method for generating a predetermined pattern on a surface of a solid sheet optical light guide illuminated by at least one light source, said light guide having a predetermined illumination area, the method comprising:
   dividing said predetermined area into a plurality of square cells;
   calculating initial half tone density values of elements of the pattern for each said cell;
   performing a linear interpolation of the density values from edge to edge of the cells so as to generate cell half tone density values;
   forming a predetermined surface disturbance on a light guide based on the generated cell half tone density values; and
   measuring light output from the light guide of each cell.

16. The method according to claim 15, further comprising:
   calculating a new half tone value for each cell so as to reduce the amount of light emission differential across a surface of the light guide; and forming another predetermined surface disturbance on a light guide based on the new half tone value for each cell.

17. The method according to claim 15, wherein a plurality of light sources are provided and at least one virtual light source is created by reflected light, and the method further includes:
   calculating the half tone values in accordance with distance from the light sources and the virtual light source.

18. The method according to claim 17, wherein the calculating of the initial half tone density value of the elements includes calculating in accordance with the following formula:

$$D_{cht} = \frac{K_{mht}}{\frac{1}{d_{L1}} + \frac{1}{d_{L2}} + \frac{1}{d_{L3}} + \frac{1}{d_{L3_{LV}} + d_{LV}}}$$

where:

$D_{cht}$ the cell half tone density.

$D_{mht}$ is the max half tone density, constant.

$d_{L1}$ is the distance to light source 1.

$d_{L2}$ is the distance to light source 2.

$d_{L3}$ is the distance to light source 3.

$d_{L3\_LV}$ is the distance from light source 3 to the reflective edge virtual bulb.

$d_{LV}$ is the distance to the reflective edge virtual bulb and wherein the calculating of the new half tone value for each cell includes calculating in accordance with the following formula:

$$D_{cht} = \frac{I_{avg} * D_{cht_p} * K_m}{(I_{lc} + I_{rc}) * 0.5}$$

where:

$D_{cht}$ is the cell half tone density $I_{avg}$ is the average non-border photometer reading $I_{lc}$ is the left cell photometer reading $I_{rc}$ is the right cell photometer reading $D_{cht_p}$ is the previous cell half tone density $k_{mht}$ is the max density normalization constant.

19. A method for constructing a solid sheet optical light guide for a digitizer tablet illuminated by at least one light source and a predetermined pattern associated therewith, the method comprising:

dividing a predetermined illumination area of the light guide into a plurality of cells;

calculating initial half tone density values of elements of the pattern for each of said cells;

performing a linear interpolation of the density values from edge to edge of the cells so as to generate cell half tone density values; and forming a predetermined surface disturbance on the light guide based on the generated cell half tone density values.

20. The method according to claim 19, further comprising:

measuring light output from the light guide of each cell;

calculating a new half tone value for each cell so as to reduce the amount of light emission differential across a surface of the light guide; and forming another predetermined surface disturbance on a light guide based on the new half tone value for each cell.

21. The method according to claim 20, wherein a plurality of light sources are provided and at least one virtual light source is created by reflected light, and the calculating of the initial half tone density values of elements of the pattern includes calculating the values in accordance with distance from the light sources and the virtual light source.

22. The method according to claim 21, wherein the calculating of the initial half tone density value of elements includes calculating in accordance with the following formula:

$$D_{cht} = \frac{K_{mht}}{\frac{1}{d_{L1}} + \frac{1}{d_{L2}} + \frac{1}{d_{L3}} + \frac{1}{d_{L3_{LV}} + d_{LV}}}$$

where:

$D_{cht}$ the cell half tone density $K_{mht}$ is the max half tone density constant $d_{L1}$ is the distance to light source 1

$d_{L2}$ is the distance to light source 2

$d_{L3}$ is the distance to light source 3

$d_{L3\_LV}$ is the distance from light source 3 to the reflective edge virtual bulb $d_{LV}$ is the distance to the reflective edge virtual bulb and wherein the calculating of the new half tone value for each cell includes calculating in accordance with the following formula:

$$D_{cht} = \frac{I_{avg} * D_{cht_p} * K_m}{(I_{lc} + I_{rc}) * 0.5}$$

where:

$D_{cht}$ is the cell half tone density $I_{avg}$ is the average non-border photometer reading $I_{lc}$ is the left cell photometer reading $I_{rc}$ is the right cell photometer reading $D_{cht_p}$ is the previous cell half tone density $k_{mht}$ is the max density normalization constant.

23. A method for generating a predetermined pattern of surface disturbances applied to a surface of a surface lighting panel illuminated by at least one light source, said lighting panel having a predetermined illumination area, the method comprising the steps of:

applying a homogenous half-tone pattern to said surface of said lighting panel;

measuring light output from the lighting panel; and calculating a new half tone value for the surface lighting panel so as to reduce the amount of light emission differential across the light guide surface.

* * * * *